(12) United States Patent
Behbehani

(10) Patent No.: US 8,346,561 B2
(45) Date of Patent: Jan. 1, 2013

(54) VOICE ACTIVATABLE SYSTEM FOR PROVIDING THE CORRECT SPELLING OF A SPOKEN WORD

(76) Inventor: Fawzi Q. Behbehani, Abdulla Mubark (KW)

( * ) Notice: Subject to any disclaimer, the term of this patent is extended or adjusted under 35 U.S.C. 154(b) by 364 days.

(21) Appl. No.: 12/710,400

(22) Filed: Feb. 23, 2010

(65) Prior Publication Data

US 2011/0208527 A1    Aug. 25, 2011

(51) Int. Cl.
 *G10L 15/22* (2006.01)
(52) U.S. Cl. ........................................ 704/270; 704/275
(58) Field of Classification Search .................. None
See application file for complete search history.

(56) References Cited

U.S. PATENT DOCUMENTS

| | | | |
|---|---|---|---|
| 4,749,353 A | 6/1988 | Breedlove | |
| 5,752,232 A | 5/1998 | Basore | |
| 6,041,300 A | 3/2000 | Ittycheriah | |
| 6,227,863 B1 | 5/2001 | Spector | |
| 6,462,616 B1 | 10/2002 | Beswick | |
| 6,629,071 B1 | 9/2003 | Mann | |
| 6,830,452 B2 | 12/2004 | Spector | |
| 7,127,397 B2 | 10/2006 | Case | |

*Primary Examiner* — Talivaldis Ivars Smits
(74) *Attorney, Agent, or Firm* — Lowe Hauptman Ham & Berner, LLP

(57) ABSTRACT

A voice activatable system for providing the correct spelling of a spoken word is disposed in an elongated body of a writing instrument such as a ball point pen. The system includes a microphone the output of which is fed to an amplifier analog to a digital converter and from there to a speech recognition program, the output of the speech recognition program is fed to a computer, namely a word processor/controller that includes a data base. The output of the speech recognition is compared with the digital library of words and when a match is found, it is amplified and fed to digital to analog connector. The output of the digital/analog computer is fed to a speaker that repeats the word with the correct pronunciation followed by a correct spelling of the word. The system includes a battery for powering the system as well as an on/off switch and a repeat button for repeating information from the system.

6 Claims, 2 Drawing Sheets

VOICE ACTIVATABLE SYSTEM FOR PROVIDING THE CORRECT SPELLING OF A SPOKEN WORD

FIELD OF THE INVENTION

This invention relates generally to a voice activatable system for providing the correct spelling for a spoken word and more particularly to a battery powered voice activatable system that is disposed within the body of a writing instrument.

BACKGROUND FOR THE INVENTION

Voice activated systems for providing the correct spelling of a spoken word are well known and have been in use for over twenty years. For example, a talking electronic learning aid for improvement of spelling is disclosed in a Breedlove U.S. Pat. No. (4,749,353). The patent discloses a spelling learning aid in which an operator orally establishes the words and tactily establishes the correct spelling for later testing by the learning aid. As disclosed the operator states words which are analyzed and synthesis control data is derived therefrom. This synthesis control data is combined with the operator inputted correct spelling, typically entered through a keyboard arrangement, and stored within the electronic apparatus. A plurality of words is preferably stored; the apparatus selectively withdraws one of the sets of synthesis control data with spelling and enunciates the word, using the synthesis control data via a synthesizer. The operator is able to attempt a spelling and have the attempt checked with the correct spelling previously stored within the apparatus. In this fashion, the apparatus is updated and varied according to operator desires so as to match the spelling requirements of the particular operator.

A more recent Spector U.S. Pat. No. (6,227,863) discloses a Phonics Training Computer System for Teaching Spelling and Reading. A phonics training system adapted to teach a pre-school child having limited vocabulary of words which identify various objects, such as people, animals and things, how each of these words is spelled, thereby making it possible for the child to read these words. The system includes a computer having a video output terminal and a memory in which is digitally stored an electronic dictionary containing the phonetic sounds of the words in the vocabulary and the alphabetic spelling of each of these words. Associated with the computer is image software containing a library of images which illustrate the various objects represented by the words in the phonetics dictionary. The computer is provided with a peripheral in the form of a voice recognition unit into which the child speaks, the unit acting to recognize the distinctive sound pattern of the child's voice and to accommodate the phonetics dictionary to this pattern.

Finally a U.S. Pat. No. 7,127,397 of Case discloses a method for training a computer system via human voice input. The method includes presenting a text spelling of an unknown word and receiving a human voice pronunciation of the unknown word. A phonetic spelling of the unknown word is determined. The text spelling is associated with the phonetic spelling to allow a text to speech engine to correctly pronounce the unknown word in the future when presented with the text spelling of the unknown word.

Notwithstanding the above, it is presently believed that there is a need and a potential market for an audio activated system for providing the correct spelling of a spoken word in accordance with the present invention. There should be a market for such systems because they are compact, combinable with a writing instrument, easily carried, and at the same time can be manufactured and sold at a competitive price. In addition, the systems are reliable, easily programmed and durable and readily kept up to date by adding new vocabulary as needed.

The systems in accordance with the present invention are particularly applicable for correctly spelling words that are normally difficult to spell. For example, in the English language, neighborhood, leisure, anesthesia, etc. are easy to read but for some individuals it is difficult to memorize their correct spelling. This issue becomes a bigger problem for a reporter covering a conference, a student in an exam, or a Doctor in a seminar where incorrect spelling can be critical.

BRIEF SUMMARY OF THE INVENTION

In essence, the present invention contemplates a voice activatable system for providing the correct spelling of a spoken word. The system includes a writing instrument such as a pen having an elongated body with a writing point at one end thereof and a microphone at an opposite end. The system also includes an audio output, a microcomputer, including a data base, having a vocabulary of words and the correct spelling for such words in the data base all disposed in the body of the pen. A key element in the present system is a voice recognition means or system and the input of the microcomputer for recognizing the sound of an individual's speech and means for matching a spoken word with a word in the data base together with means for activating the audio output to correctly spell the word and wherein the pen includes a battery and a switch for turning the system on and off.

In a preferred embodiment of the invention the system includes voice recognition means for recognizing distinct words and the sequence pattern of the audible inquiry thereby prompting the microcomputer to scan the data base to find one answer that most clearly relates to the audible inquiry. Then when a match is found, the system provides the correct spelling of the word audibly. In one embodiment of the invention, the system also provides the correct pronunciation of the word and a switch for repeating the audio output.

The invention will now be described in connection with the following drawings wherein like numbers have been used to identify like parts.

DESCRIPTION OF THE PREFERRED EMBODIMENTS OF THE INVENTION

Figure 1:
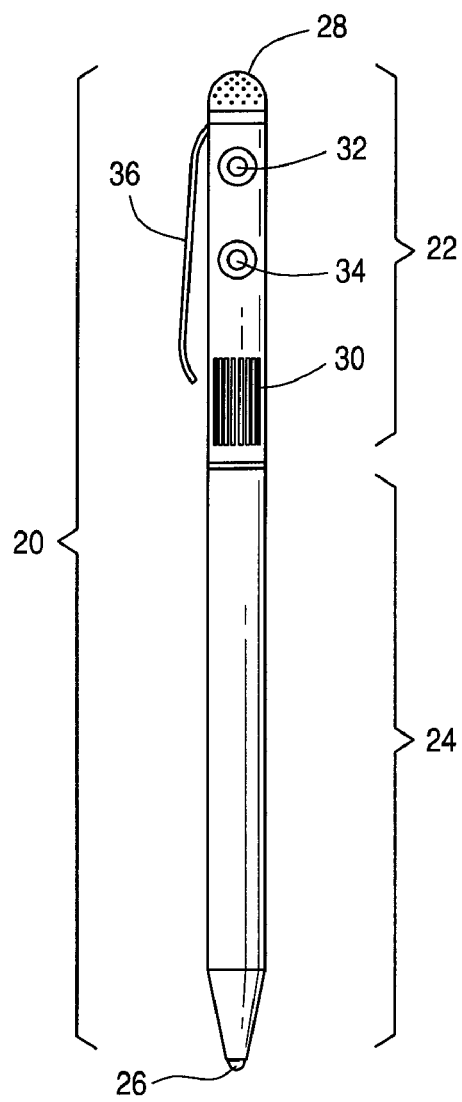
FIG. 1 is a schematic illustration of a first embodiment of the invention with an upper portion of the pen body in a closed position.
Figure 2:
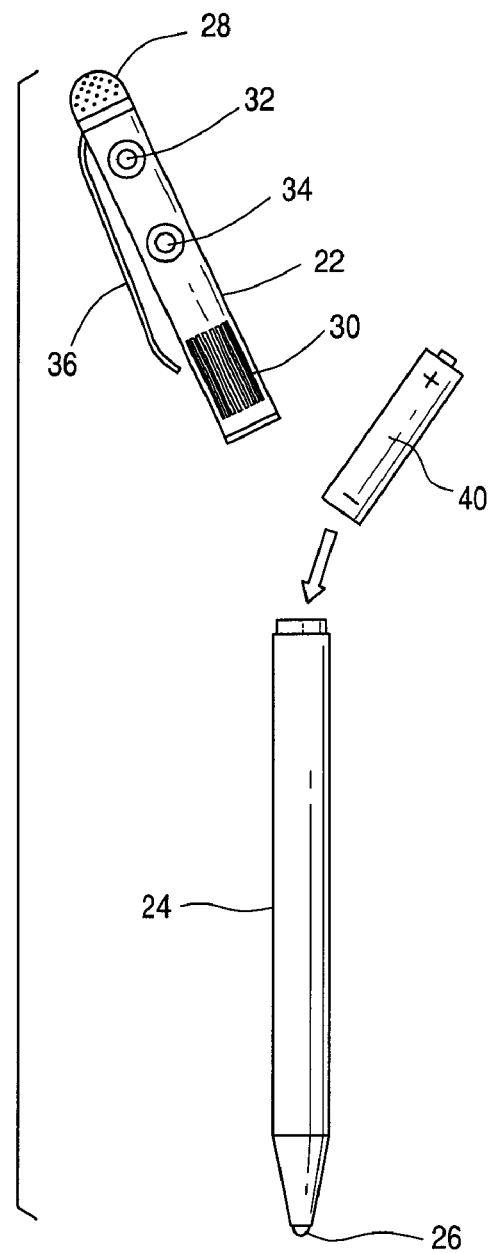
FIG. 2 is schematic illustration of the first embodiment of the invention with an upper portion of the pen's body in an open position for receiving the battery.

Referring now to FIGS. 1 and 2 a voice activatable system for providing the correct spelling of a spoken word is disposed in an elongated body 20 of a writing instrument as for example a ball point pen. The body 20 includes an upper and lower part 22 and 24 with a writing point 26 in the lower part 22 and extending outwardly at one end of the elongated body 20. The upper part 22 includes a microphone 28 at an opposite end of the elongated body 20 and a speaker 30 in a lower portion of the upper part 22.

As shown in FIGS. 1 and 2, the upper part 22 also includes a start button 32 to record a spoken word as well as a repeat button 34 to repeat the spelling of the spoken word. As illustrated, the pen also includes a pocket clip 36 and a writing tip 26. As shown in FIG. 2 the upper part 22 is removable from the lower part 24 by being unscrewed therefrom in a conventional manner for replacement of a battery 40.

Figure 3:
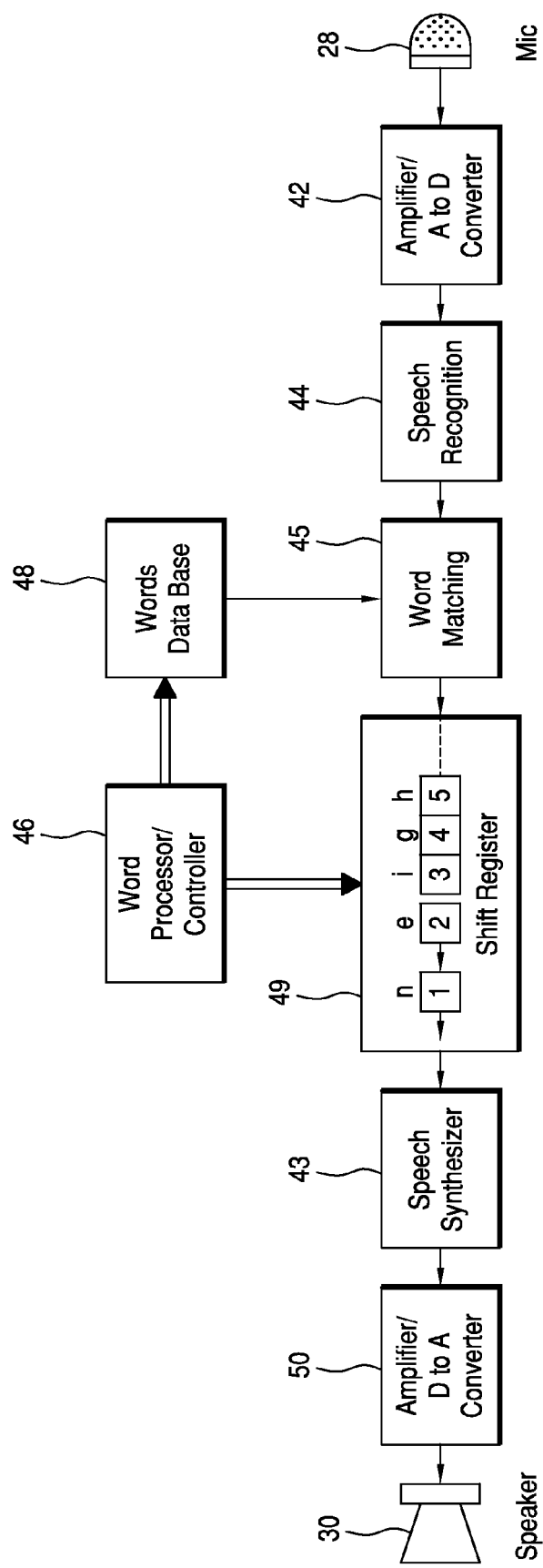
FIG. 3 is a block diagram illustrating a circuit for a voice activatable system for providing the correct spelling of a spoken word in accordance with the present invention.

FIG. 3 illustrates a simple diagram for a voice activatable system for providing the correct spelling of a spoken word in accordance with one embodiment of the invention that incorporates speech recognition. As shown, the system includes a microphone 28 that is used to enter a spoken word into the system. The output of the microphone 28 is fed to an amplifier with an analog to digital converter 42 and from there to a speech recognition unit 44.

The speech recognition unit 44 is of conventional design and may be marketed by Dragon Systems, Inc. and identified as "Dragon Naturally Speaking." The software when used with a standard computer or PC has an output that makes it possible for its user to speak a word into the microphone 28 associated with a word processor controller 46 having a data base 48 after pressing the start button 32 and obtain the correct spelling audibly from the speaker 30. The word processor controller forwards the data from the word data base to an amplifier digital to analog converter 50 and then to the speaker 30.

The Dragon system includes in its memory a vocabulary of 30,000 words with correct spelling and pronunciation. Dragon Naturally Speaking is a basic word processor that learns and recognizes the voice of an individual, then a user can speak a word into the microphone, listen to the correct pronunciation followed by the correct spelling and by pressing the button 34 have the information repeated.

When an individual presses the button 32 (FIGS. 1 and 2) and speaks a word into the microphone 28 (FIG. 3) the output analog signal from the microphone 28 is amplified and converted to a digital signal by an amplifier analog to digital converter 42 and fed to the speech recognition unit 44. The output is subsequently fed to a word matching unit 45 that compares the spoken word with words in a data base 48. For example, when an entire word is input and comparison is made and the output forwards the matched word to a shift register 49. The shift register 49 controls the word processor and controls the word processor/controller 46 by breaking the word down into its letter by letter sequence. For example, if the spoken word is "neighborhood", the processor sends the letter "n" and then the letter "e" and then the letter "i" and etc. A speech synthesizer 43 receives the letter "n" and produces the sound of the letter plus the other letters until the word is complete. This is fed to a digital to analog converter 50 and feeds the digital signal to an analog signal to digital converter and then by means of the speaker 30 pronounces the word and spells the word one letter at a time.

While the invention has been described in connection with its accompanying drawings, it should be recognized that changes and modifications may be therein without departing from scope of the appended claims.

What is claimed is:

1. A voice activatable system for providing the correct spelling of a spoken word, said system comprising:
    an elongated housing including a writing element supported within said housing at one end thereof;
    a microcomputer having a voice activatable input and an audio output including a speaker;
    a data base including an electronic vocabulary with correct spelling of the words in the vocabulary disposed in said housing;
    a voice recognition means disposed within said housing for recognizing the sounds of an individual's speech spoken into the voice activatable input and means for matching a spoken word with a word in said data base; and
    means for activating said audio output to correctly spell the word and wherein said housing includes a switch to turn said system on and off.

2. A voice activatable system for providing the correct spelling of a spoken word according to claim 1 wherein said voice recognition means recognizes distinct words and the sequence pattern of the audible inquiry thereby prompting the microcomputer to scan the data base to find one answer most closely related to the audible inquiry and when the match is found to present the correct spelling of the word audibly.

3. A voice activatable system for providing the correct spelling of a spoken word according to claim 2 in which the system provides a correct pronunciation of the word before the correct spelling.

4. A voice activatable system for providing the correct spelling of a spoken word according to claim 3 which includes a stop start button to turn the system on and off.

5. A voice activatable system for providing the correct spelling of a spoken word according to claim 4 which includes a second button for repeating the pronunciation and correct spelling.

6. A voice activatable system for providing the correct spelling of a spoken word, said system consisting of:
    an elongated housing including a writing element supported within said housing at one end thereof;
    a microcomputer having a voice activatable input and an audio output including a speaker disposed in said housing;
    a data base including an electronic vocabulary with correct spelling of the words in the vocabulary disposed in said housing;
    a voice recognition means disposed within said housing for recognizing the sounds of an individual's speech spoken into the voice activatable input and means for matching a spoken word with a word in said data base; and
    means for activating said audio output to correctly spell the word and wherein said housing includes a switch to turn said system on and off.

* * * * *